US010038569B2

(12) United States Patent
Liu et al.

(10) Patent No.: US 10,038,569 B2
(45) Date of Patent: Jul. 31, 2018

(54) SELF-ADAPTING BAUD RATE

(71) Applicant: Intel IP Corporation, Santa Clara, CA (US)

(72) Inventors: Chunhui Liu, Dresden (DE);
Chengzhou Li, Bridgewater, NJ (US);
Bruno Jechoux, Antibes (FR)

(73) Assignee: Intel IP Corporation, Santa Clara, CA (US)

( * ) Notice: Subject to any disclaimer, the term of this patent is extended or adjusted under 35 U.S.C. 154(b) by 118 days.

(21) Appl. No.: 15/083,578

(22) Filed: Mar. 29, 2016

(65) Prior Publication Data
US 2017/0288899 A1 Oct. 5, 2017

(51) Int. Cl.
H04L 12/40 (2006.01)
H04J 11/00 (2006.01)
H04L 7/00 (2006.01)
H04W 84/12 (2009.01)

(52) U.S. Cl.
CPC .......... *H04L 12/4013* (2013.01); *H04J 11/00* (2013.01); *H04L 7/0016* (2013.01); *H04W 84/12* (2013.01)

(58) Field of Classification Search
CPC .................................................. H04L 12/4013
See application file for complete search history.

(56) References Cited

U.S. PATENT DOCUMENTS

| 4,748,625 A | 5/1988 | Krause et al. |
| 5,490,209 A | 2/1996 | Kennedy et al. |
| 5,612,961 A | 3/1997 | Cabezas et al. |
| 5,751,725 A * | 5/1998 | Chen ............. H04L 25/0262 714/708 |
| 6,213,879 B1 * | 4/2001 | Niizuma ............ H04L 7/0008 341/50 |
| 6,788,737 B1 * | 9/2004 | Miyoshi ............ H04L 1/0003 370/468 |
| 9,337,934 B1 * | 5/2016 | Agazzi .............. H04B 10/40 |
| 9,380,494 B2 * | 6/2016 | Sirotkin ............ H04W 48/16 |
| 9,735,881 B1 * | 8/2017 | Agazzi ............. H04B 10/516 |
| 9,735,948 B2 * | 8/2017 | Sengoku ........... H04L 7/0008 |
| 9,755,818 B2 * | 9/2017 | Sengoku ........... H04L 7/0087 |

(Continued)

OTHER PUBLICATIONS

International Search Report and Written Opinion in International Application No. PCT/US2017/019774 dated Apr. 25, 2017.

*Primary Examiner* — Andrew Lai
*Assistant Examiner* — Andrew C Lee
(74) *Attorney, Agent, or Firm* — Alliance IP, LLC

(57) ABSTRACT

In an example, there is disclosed an apparatus, having: a first network interface, having a first clock and a local communication driver to communicatively couple the first network interface to a second network interface having a second clock; and one or more logic elements, including at least one hardware logic element, providing a synchronization engine to: send a first plurality of data words from the first wireless interface to the second wireless interface via the local communication driver; receive back from the second wireless interface a second plurality of data words; assign a plurality of error rates to the data words of the second plurality of data words, the plurality of error rates indicating match or mismatch; identify a range of least error values within the plurality of error rates; and select an agreed baud rate from within the range.

25 Claims, 7 Drawing Sheets

(56) References Cited

U.S. PATENT DOCUMENTS

| | | | |
|---|---|---|---|
| 2004/0098489 A1 | 5/2004 | Cedola | |
| 2005/0286410 A1* | 12/2005 | Truong | H04L 1/0002 370/216 |
| 2006/0109931 A1* | 5/2006 | Asai | H04B 1/0003 375/299 |
| 2006/0270360 A1* | 11/2006 | Han | H04B 7/0626 455/69 |
| 2008/0113634 A1* | 5/2008 | Gates | H04B 1/406 455/102 |
| 2010/0075617 A1* | 3/2010 | Ko | H04B 7/061 455/78 |
| 2010/0098047 A1* | 4/2010 | Zhou | H04L 47/10 370/345 |
| 2010/0103994 A1* | 4/2010 | Frans | H04L 1/0002 375/221 |
| 2010/0135314 A1* | 6/2010 | Fourcand | H04J 3/1611 370/419 |
| 2010/0232487 A1 | 9/2010 | Sidhu et al. | |
| 2013/0223240 A1* | 8/2013 | Hayes | H04W 28/0231 370/252 |
| 2013/0322462 A1* | 12/2013 | Poulsen | H04J 3/06 370/458 |
| 2013/0329821 A1* | 12/2013 | Chen | H04L 5/0064 375/267 |
| 2014/0153680 A1* | 6/2014 | Garg | H04L 7/0025 375/371 |
| 2014/0201329 A1* | 7/2014 | Himayat | H04L 12/6418 709/219 |
| 2015/0020134 A1* | 1/2015 | Bowler | H04N 21/2383 725/116 |
| 2015/0098537 A1* | 4/2015 | Sengoku | H04L 7/0087 375/355 |
| 2016/0154622 A1* | 6/2016 | Zwart | G06F 13/385 700/94 |
| 2017/0177540 A1* | 6/2017 | Frans | G06F 13/4286 |

* cited by examiner

SELF-ADAPTING BAUD RATE

This disclosure relates in general to the field of wireless communication, and more particularly to a system and method for providing a self-adapting baud rate.

BACKGROUND

Contemporary devices are provided with multiple network interfaces, such as wired (Ethernet), Bluetooth, wireless local area network (WLAN) (also known as "WiFi"), and 4G Long-Term Evolution (LTE) cellular. Each interface may have its own adapter, and each adapter may have its own clock.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
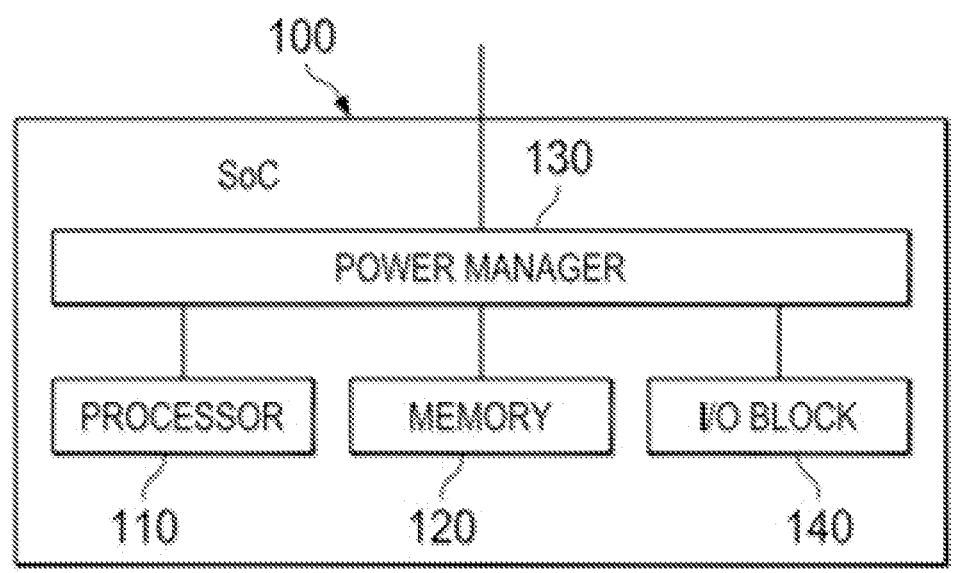
FIG. 1 is a block diagram of a computing system according to one or more examples of the present Specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

By way of example, the present Specification discusses a "smart phone" or tablet with two different wireless interfaces: a 4G cellular interface that connects to an "eNodeB" of a cellular network, and a WLAN interface that connects to a wireless access point (WAP). There are various situations in which a user may want to use both interfaces simultaneously. These two example interfaces should be understood as illustrations of the techniques disclosed herein, and analogous techniques may be applied to a broad range of wired and wireless interfaces to achieve similar results.

With the increasing usage of many different wireless technologies and services, many devices, and in particular mobile devices, are equipped with multiple wireless transceivers, e.g., 4G cellular, WLAN, Bluetooth, industrial, scientific, and medical (ISM) bands, and Global Navigation Satellite System (GNSS) by way of non-limiting example. In some embodiments, in-device coexistence (IDC) interference is a serious issue, at least partly because of the proximity of the devices to one another. This interference is especially problematic when two interfaces are used simultaneously on the same device, such as simultaneously using 4G cellular and WLAN on a smart phone.

For example, 4G cellular and ISM/GNSS radios may work concurrently in adjacent, sub-harmonic, or even on the same frequency bands. Interference from this concurrent operation may be partly addressed by frequency filters, but the solution is imperfect. Thus, it is advantageous to introduce a signaling mechanism to further address IDC issues. Thus, the 4G cellular and WLAN interfaces may each include a universal asynchronous receiver/transmitter (UART) interface by which they can pass signals back and forth, allowing them to adjust their behaviors to accommodate IDC activity.

However, it has been observed that dual asynchronous receiver/transmitter (DART) baud may not strictly align, even if both UARTs are operating at the identical nominal frequency. Each chip may have its own clock, and even when the clocks have the same nominal baud rate, they may have different tolerances, and may behave differently in the presence of stimuli, such as temperature, that can cause clock drift.

Thus, because of production quality differences, circuit limitations, or other issues, the effective baud rate of a UART port can differ from its nominal value over a particular range. Throughout this Specification, the value S is used to refer to the nominal baud rate provided for a clock. Thus, for a 1 megabit baud rate (1 MHz clock), S=1e6 baud. The error tolerance of a clock, also referred to as its variance, is referred to herein as M. Thus, if a clock has a 3% tolerance, then M=0.03 S, meaning that the most variable range for S is S±0.03 S. Between two clocks, the "most variable" clock is the one with the widest range of error. For example, between a clock with a 3% error tolerance and a clock with a 5% error tolerance, the most variable clock is the one with 5% tolerance. Several computations disclosed herein use the most variable clock, meaning for example that if a baud rate is swept over the range of the most variable clock, then most variable M is chosen. The sweep may thus initialize at S−M, and conclude at S+M, with an appropriately sized step size, which may be based on the step size provided by the clock.

To provide a concrete example, take two clocks with a nominal frequency of 1 MHz, each providing a nominal baud rate of 1 megabit. One clock has a tolerance of 3%, and one has a tolerance of 5%. Thus, S=1e6 baud. The most variable M is chosen, in this case M=±5%. An appropriate step size is chosen, such as 0.01 megabaud. Thus, the sweep may be from 0.95 megabaud to 1.05 megabaud.

In an example of the present Specification, an echo mode is used to calibrate the baud rate. This may be performed once in the context of manufacturing tests, if varying operation conditions such as temperature or aging have a negligible impact, or periodically in the operational mode otherwise. One interface sends a training sequence to the second interface. The training sequence may be a data word for the interface, such as 10 bits (8 data bits, plus a start bit and stop bit) for a traditional UART interface. A "word" as used herein should be understood to be any sequence of one or more bits that is provided together. The second interface receives the sequence and echoes it back to the first interface. The sender then compares the echoed sequence to the original sequence. If the echo matches the original, then there is a zero error rate for that training word. The range of frequencies may be swept across the range of the most variable clock, and for each step, the error rate is observed and recorded in an echo log (which may simply be a sequence of Boolean indicators—either an error occurred on that step, or an error did not occur). Once the full frequency range has been swept, a range of contiguous frequency samples with a zero error rate may be identified. The sender selects an agreed baud rate, such as from a midpoint of the range of contiguous frequencies, and both UARTs use the agreed baud rate for their communication. This method may be performed at an appropriate time, such as upon startup, or upon encountering an error, by way of non-limiting example.

In an alternative embodiment, the frequency range is not swept as above. Rather, a sequence of N data words is sent and echoed back from the receiver. The sender inspects the N data words, and identifies position n, which is the first bit position where an error is observed. The clock drift may be inferred from the position of this error, for example $$e = \frac{0.5}{n},$$

and the baud rate may be adjusted up or down by e.

Advantageously, this method provides a solution for at least two issues that arise in the case of a baud rate mismatch: erroneous reception of a peer UART, and erroneous reception of a local UART. If the UART baud rate is not calibrated between the WLAN and 4G cellular modems, the UARTs may in some cases synchronize and successfully communicate only coincidentally. Consequently, the interference mitigation techniques that rely on WLAN and 4G cellular traffic alignment may work only occasionally. The throughputs for both WLAN and 4G cellular may thus substantially degrade, and in some cases radio links may be maintained even though the radio itself is of relatively high quality. The present method helps to ensure functionality of IDC solutions, and makes chips more tolerant of clock variation from both production and environmental stimuli.

A system and method for devices with self-adapting baud rates will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of system-on-a chip (SoC) 100 according to one or more examples of the present Specification. SoC 100 is disclosed as a non-limiting example, but in a more general sense, the teachings of this Specification are applicable to providing any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Thus, SoC 100 should be understood to encompass any such computing device.

In this example, SoC 100 includes a number of computing elements, which include any active or passive elements of SoC 100 that contribute to SoC 100 to perform its intended function. In this example, processor 110 connected to a memory 120, having stored therein executable instructions for providing appropriate software, such as an operating system and operational software. Other components of SoC 100 include an input/output (I/O) block 140 and a power manager 130. This architecture is provided by way of example only, and is intended to be non-exclusive and non-limiting. In a specific example, each of the listed components may be a physically separate intellectual property (IP) block, designed in advance for use on SoC 100, and each may occupy a separate space on a silicon wafer. The separate IP blocks may communicate with each other via an on-chip interconnect fabric.

In other examples, the various disclosed elements may be logical divisions only, and need not necessarily represent physically separate hardware and/or software components. Certain computing devices provide main memory and storage, for example, in a single physical memory device, and others provide them in separate devices. In the case of virtual machines or hypervisors, all or part of a function may be provided in the form of software or firmware running over a virtualization layer to provide the disclosed logical function. In other examples, a device such as a network interface may provide only the minimum hardware interfaces necessary to perform its logical operation, and may rely on a software driver to provide additional necessary logic. Thus, as appropriate to the embodiment, each logical block disclosed herein may broadly include one or more logic elements configured and operable for providing the disclosed logical operation of that block. As used throughout this Specification, a "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 110 may be communicatively coupled to memory 120 via any suitable memory bus, which may be for example a direct memory access (DMA) or any other suitable bus. Processor 110 may be communicatively coupled to other devices via a system bus or fabric. As used throughout this Specification, a "fabric" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 110 may be treated as only one core of a multi-core processor, or may be treated as the entire multi-core processor, as appropriate. In some embodiments, one or more co-processor may also be provided for specialized or support functions.

To simplify this disclosure, memory 120 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 120 may comprise both a relatively low-latency volatile main memory, and a relatively higher-latency non-volatile memory. However, the two species of memory need not be physically separate devices, and in some examples may represent simply a logical separation of function (for example, in some devices, all memory is volatile, or all memory is nonvolatile). It should also be noted that although DMA is disclosed by way of non-limiting example, DMA is not the only protocol consistent with this specification, and that other memory architectures are available.

Memory 120 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Memory 120 may be, or may include therein, a database or databases or data stored in other configurations, and may include a stored copy of operational software such as an operating system and operational software. Many other configurations are also possible, and are intended to be encompassed within the broad scope of this Specification.

I/O block 140 may be provided to communicatively couple SoC 100 to a wired or wireless network. A "network," as used throughout this Specification, may include any communicative platform operable to exchange data or information within or between computing devices, including by way of non-limiting example, serial or parallel communication ports, an ad-hoc local network, an internet architecture providing computing devices with the ability to electronically interact, an asynchronous transfer mode (ATM) network, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

I/O block 140 may be a standalone-computing device in its own right, having its own processor (which may be a different type of processor rom processor 110), registers, and local memory. An example of an I/O block 140 is discussed in more detail in FIG. 2. In some cases, SoC 100 may instead be a modular device, in which case I/O block 140 may be provided as a separate module, such as an Intel® XMM™ 7360 modem platform with multiple modem interfaces.

Power manager 130 may be or include a power supply, such as a switching regulator, as well as logic to regulate power to SoC 100. For example, power manager 130 may include logic to detect different operating modes, and to intelligently provide a regulated voltage to on-chip components as the demands of those operating modes dictate.

For example, temperature sensors within power manager 130 may detect when the temperature of processor 110 rises above a threshold, which may indicate that processor 110 is in danger of being damaged. To prevent damage, power manager 130 may reduce the voltage supplied to processor 110, thus reducing the operating power, and reducing the temperature.

Power manager 130 may also supply different input voltages to different computing elements of SoC 100 according to the power demands of those processing elements. In various embodiments, power manager 130 may also include current limiters, voltage references, meters, sensors, transducers, drivers, switches, and any other elements that assist power manager 130 in performing its work.

Figure 2:
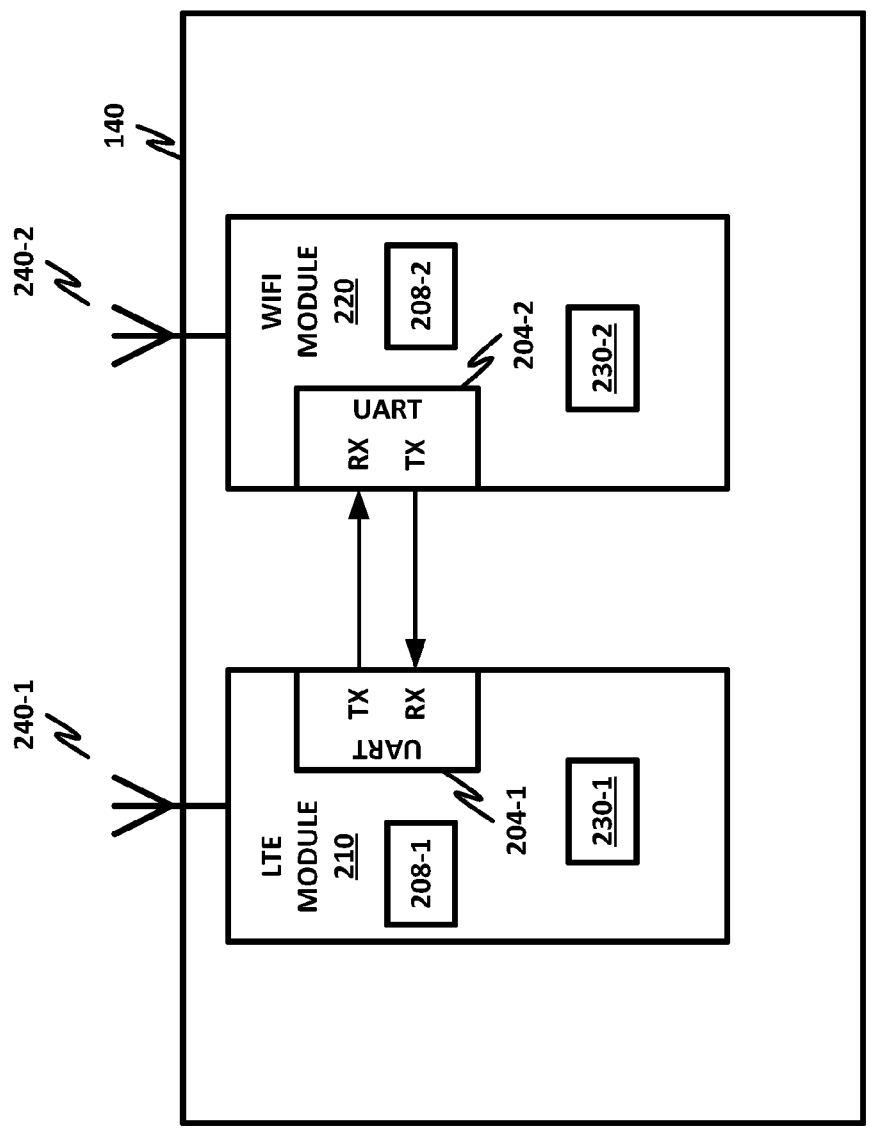
FIG. 2 is a block diagram of an input/output (I/O) module according to one or more examples of the present Specification.

FIG. 2 is a block diagram of an embodiment of I/O block 140 according to one or more examples of the present Specification. In the example of FIG. 2, I/O block 140 includes two wireless communication modules, each of which may be a modem for interfacing to a different wireless protocol. An 4G cellular module 210 and WLAN module 220 are disclosed by way of example, but these two communication modules should be understood to be non-limiting illustrative examples only. In appropriate embodiments, I/O block 140 may include any number of suitable communication modules, for communicating over any appropriate wired or wireless protocols.

Each module includes at least one respective antenna 240-1, and 240-2. Antennas 240-1 and 240-2 may be built-in antennas, external antennas, or third-party add-on antennas in appropriate circumstances. It should also be noted that in certain embodiments, at least one of the communication modules may be a wired communications module, such as Ethernet, in which case in place of antenna 240, a wired connection may be provided.

Because 4G cellular module 210 and WLAN module 220 need to be able to operate in IDC mode, each is provided with a UART, 204-1 and 204-2 respectively, which may enable synchronization, data sharing, or other general communication.

UARTs 204 should be understood to be a non-limiting example of a local communication driver. As used throughout this Specification, a local communication driver includes any circuit, microchip, hardware, software, firmware, combination of hardware, software, or firmware, or any other engine that is configured to provide data communication services between two communication modules. The local communication driver may be in addition to the communication driver of a module that provides an interface to the external network, such as WLAN or 4G cellular. Using UART 204, 4G cellular module 210 and WLAN module 220 can synchronize data transfers between each other.

In this example, UART 204-1 has respective transmit and receive pins, and UART 204-2 has respective receive and transmit pins. By way of non-limiting example, the transmit pin of UART 204-1 may be wired to the receive pin of UART 204-2. The transmit pin of UART 204-2 may in its turn be wired to the receive pin of UART 204-1.

It should also be noted that UARTs 204-1 is disclosed by way of example as a separate device from UART 204-2, and in this case each module has its own UART 204. However, in other embodiments, a single local communication driver, such as a unified UART 204, may be provided, and 4G cellular module 210 and WLAN module 220 may each communicatively couple to the single UART 204. Thus, UART 204 could be a separate UART provided externally to both 4G cellular module 210 and WLAN module 220, and may be a medium providing communication between the two modules.

According to embodiments of the present Specification, 4G cellular module 210 may need to synchronize with WLAN module 220 as described above. However, 4G cellular module 210 and WLAN module 220 may each have their own individual clocks. While these clocks may have the same nominal baud rate S for communicating over UARTs 204, the clocks are real world devices that have an imperfect tolerance, and they may be sensitive to temperature or other environmental fluctuations. Thus, if clock 208-1 and clock 208-2 both have a nominal baud rate of 1 MHz, they may nevertheless provide a different clock rate. For example, clock 208-1 may have a tolerance of ±3%, while clock 208-2 may have a tolerance of ±5%.

In that case, if clock 208-1 is operating at +2%, while clock 208-2 is operating at −4%, synchronization errors can occur between UART 204-1 and UART 204-2. As the clocks drift out of sync, error bit errors may be experienced. Thus, the present Specification illustrates embodiments wherein the baud rate self-adjusts to ensure that the two clocks remain in sync.

4G cellular module 210 and WLAN module 220 may each include a respective synchronization engine 230 to carry out the synchronization operations discussed herein. As used throughout this Specification, an "engine" includes any combination of one or more logic elements, of similar or dissimilar species, operable for and configured to perform one or more methods provided by the engine. Thus, the synchronization engine may include a processor of any species, as well as logic for instructing the software to perform the methods herein. The processor and logic may be embodied in processor 110 and memory 120, or in an on-board processor and memory of 4G cellular module 210 and WLAN module 220. In some cases, the synchronization engine may include a special integrated circuit designed to carry out a method or a part thereof, and may also include software instructions operable to instruct a processor to perform the method. In some cases, the synchronization engine may run as a "daemon" process. A "daemon" may include any program or series of executable instructions, whether implemented in hardware, software, firmware, or any combination thereof that runs as a background process, a terminate-and-stay-resident program, a service, system extension, control panel, boot up procedure, BIOS subroutine, or any similar program that operates without direct user interaction. In certain embodiments, daemon processes may run with elevated privileges in a "driver space," or in ring 0, 1, or 2 in a protection ring architecture. It should also be noted that the synchronization engine may include other hardware and software, including configuration files, registry entries, registers, and interactive or user-mode software by way of non-limiting example.

In one example, the synchronization engine includes executable instructions stored on a non-transitory medium operable to perform a method according to this Specification. At an appropriate time, such as upon startup or upon a command from a user, the processor may retrieve a copy of the instructions from storage and load it into memory. The processor may then iteratively execute the instructions of the synchronization engine to provide the desired method.

Figure 3:
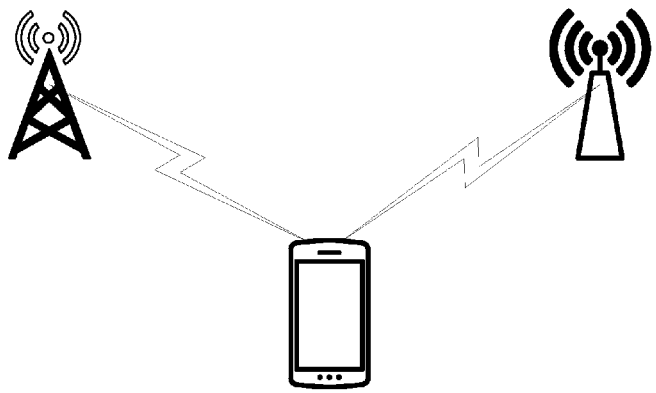
FIG. 3 is a system-level illustration of a mobile device simultaneously communicating on two or more wireless interfaces according to one or more examples of the present Specification.

FIG. 3 is a system-level diagram illustrating the interference issues discussed above. In this example, UE 310 is a smart phone, tablet, laptop computer, or other device with wireless communication capabilities. In this case, UE 310 includes both an 4G cellular interface and a WLAN interface. UE 310 is simultaneously communicatively coupled to eNodeB 340 and WAP 330. As discussed above, there are many situations in which a user may need to simultaneously communicate over both 4G cellular link 342 and WLAN link 332. In those cases, 4G cellular module 210 and WLAN module 220 may need to coordinate with one another. Thus, each may include a respective UART 204, and they may communicate over with each other over their respective UARTs.

As illustrated in FIG. 3, when WLAN module 220 transmits on frequencies that are close to or that overlap the 4G cellular operating band, it can coordinate its transmission with 4G cellular module 210, so that 4G cellular module 210 can ignore or reject signals "polluted" by the WLAN transmission. Conversely, if an 4G cellular transmission is interfering with a high priority WLAN transmission, WLAN module 220 may request a temporary suspension of the interfering 4G cellular activity.

Figure 4:
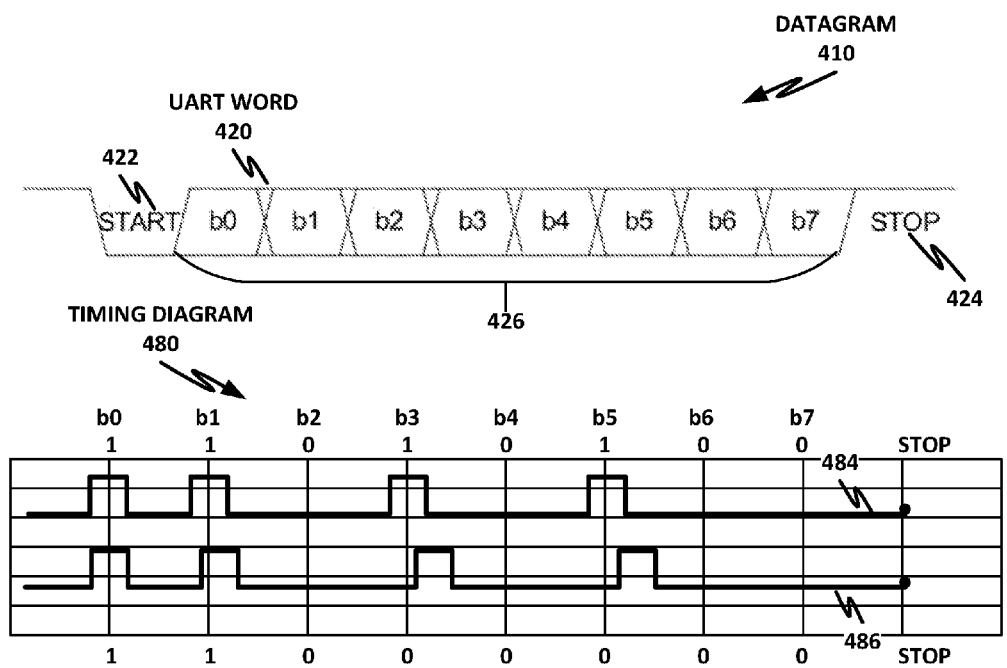
FIG. 4 is a timing diagram illustrating timing difficulties that may be encountered while communicating on two or more wireless interfaces according to one or more examples of the present Specification.

FIG. 4 illustrates how errors can be encountered when the clocks 208 of the respective communication modules are slightly out of sync. In this example, datagram 410 illustrates an example UART word 420. UART word 420 includes a start bit 422, a stop bit 424, and a payload 426 comprising 6 data beds numbered respectively b0 through b7. Start bit 422 and stop bit 424 are used to identify this as a UART character. Note that a 10-bit UART data word is disclosed herein by way of non-limiting example, but a data word may be of any suitable size to fit a particular embodiment. Thus, a word should be understood to be any sequence of one or more bits. Such UART characters can be exchanged between 4G cellular and WLAN modems.

In general practice, the UART character is sampled in the middle of the bit. However, as illustrated in timing diagram 480, in the event of clock drift, the sampling may be shifted so that some bits may be misidentified. For example, in this illustration, the second waveform has a slightly slower clock, so that bits 3 and 5 erroneously appear as "0," where they should be "1." Bits 4, 6, and 7 (shown at 484 and 486) correctly appear as "0," but this may be deemed coincidental to the timing of the transition from the 1 state to the 0 state.

This issue may become more serious when several UART messages are sent in a row. The drifting accumulates, and the data are significantly misaligned in latter parts of the message. For example, in one test, a WLAN baud rate drift of approximately 6% was observed with respect to the rate of an 4G cellular modem. When the 4G cellular modem received more than two messages, the sampling drift definitively resulted in incorrect detection. With a 10% drift, data failures were encountered within a single 10-bit data word.

Advantageously, these calibration errors can in some cases be corrected without modifying the hardware from its previous state. Rather, coordinating software can be introduced to cause the hardware to synchronize so that true coordination can be achieved.

The following symbols may be used in describing the methods of this Specification:
  a. x bits per second—the tolerant variation of baud rate at the sender.
  b. S bits per second—the nominal agreed baud rate between sender and receiver.
  c. M bits per second—the variation in baud rate, and in particular, the most diverse baud rate between the two devices.

The baud rate of the repeater device (i.e., receiver) varies from S−M to S+M. With a step size of x, a sweep of baud rates across the variance may be performed, with a total of $$\frac{2M}{x}$$

steps in the sweep. To start the sweep, the sender initiates the baud rate to S−M. In some cases, setting the baud rate may be performed via an out-of-band signaling wire that operates at a slower, more fault-tolerant rate.

The sender executes the echo, and receives the data word back from the receiver. In an example, the data word may be selected to maximize the number of transitions and thus increase the probability of an error, such as 01010101 or 10101010. The sender then compares the received echo word to the original data word. If they are identical, a success message (such as "1") may be written to an echo log. If they are not identical, a failure message (such as a "0") may be written to the echo log.

The sender then increases the baud rate by x and repeats the procedure until it reaches the final baud rate S+M.

After the procedure above, the echo log includes a series of messages indicating which steps in the sweep were successful, and which failed. The echo log may be as simple as a string of Boolean indicators, or may be much more detailed, depending on the embodiment. In this case, assume that the most variable clock has a 5% tolerance, and that each step is a 1% increase. The following results may be observed, with "1" indicating success, and "0" indicating failure:

| Step | −5 | −4 | −3 | −2 | −1 | S | +1 | +2 | +3 | +4 | +5 |
|---|---|---|---|---|---|---|---|---|---|---|---|
| Res. | 0 | 0 | 0 | 1 | 0 | 1 | 1 | 1 | 0 | 0 | 0 |

We can observe here that at the steps −2, the nominal baud rate S, and at +1, and +2, successes were observed. At the other baud rates, failures were observed. To select a best agreed baud rate, a range [a,b] is identified, with a and b being inclusive terminals of a contiguous series of successful steps in the sweep. Thus, −2 will not be included in the range, because it is not a contiguous series. Rather a=S and b=+2 may be chosen. The agreed baud rate may then be chosen as a midpoint in this range. The midpoint may be chosen, for example, as a median if quantum increments are used (in this case, +1), or if the baud rate is more nearly continuously variable, then it may be chosen as a mathematical mean $$\left(\frac{a+b}{2}\right).$$

by choosing a middle value, such as the median or mean, we account for the possibility that additional drift may occur, such as with temperature variations. This increases the likelihood that the IDC solution will remain functional. The devices save the agreed baud rate for future use. In laboratory testing, this procedure has been observed to successfully calibrate the baud rate of two different devices to enable IDC operation.

An alternative embodiment is also provided. In this case, rather than a baud rate sweep, a single series of N data words is sent to the receiver and echoed back. Once the echo back is received, the first erroneous bit, n, is observed. The degree of relative drift can then be inferred and adjusted appropriately.

In this case, a message may be sent with N consecutive, contiguous, identical UART words (for example, 01010101 or 10101010 as before). After receiving the echo back, the sender notes the rank n of the first erroneous bit in the echo, with the start bit of the first UART word being position 0, and positions being numbered sequentially from there. A baud rate error e (in %) may then be calculated via the formula $$e = \frac{0.5}{n}.$$

N may be selected according to $$N = ceil\left(\frac{0.5}{e_{target} * l_{word}}\right),$$

where $e_{target}$ is the variance in percent of the most variable clock, and $l_{word}$ is the length of a word (i.e., 1 or more bits). Thus, for a 10-bit UART word and a clock with a variability of ±3%, $$N = ceil\left(\frac{0.5}{0.03 * 10}\right),$$

or a two-word message. Once e is determined, the sender increases the baud rate by e.

Figure 5:
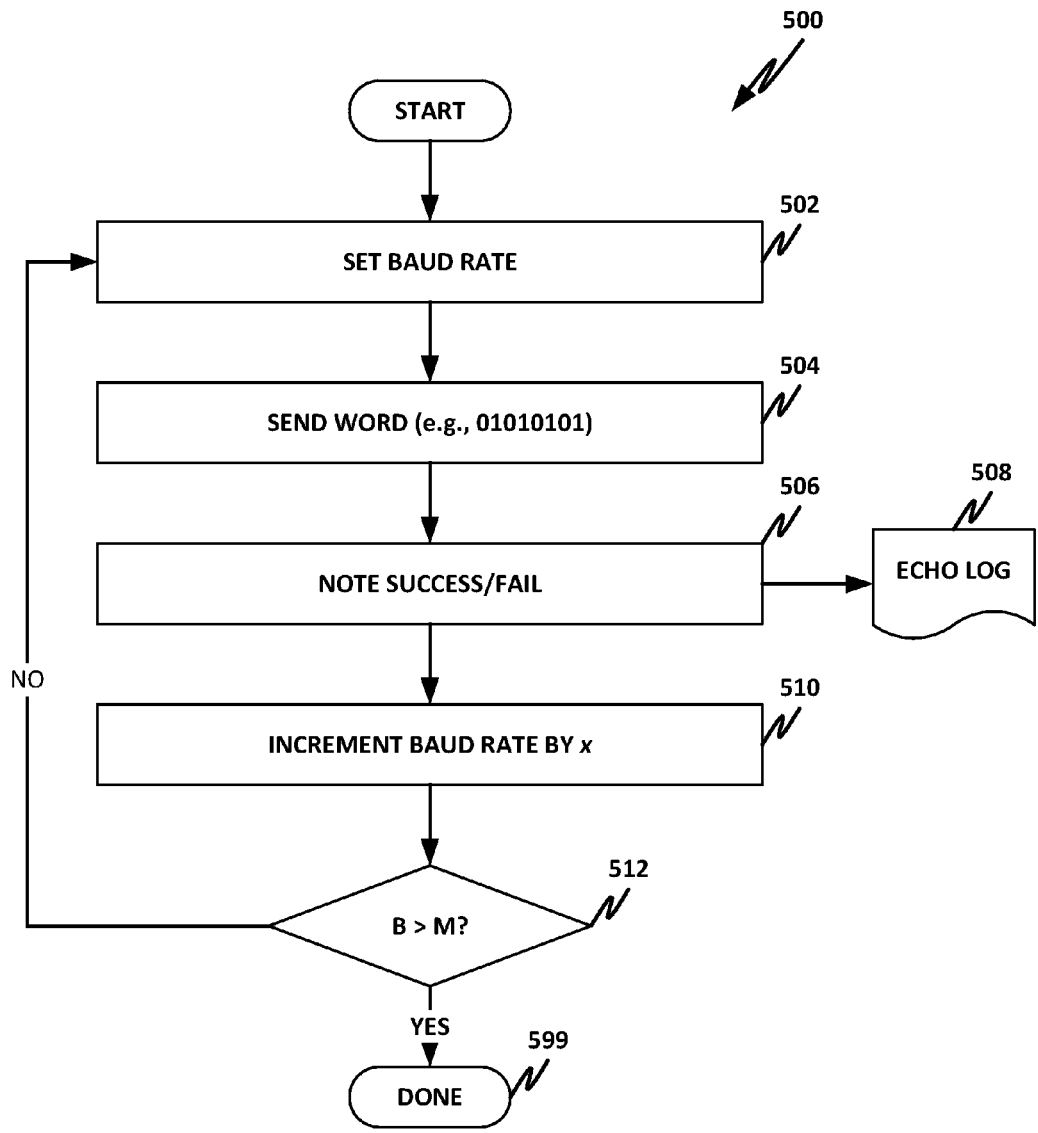
FIG. 5 is a flow chart of a method for adjusting a baud rate according to one or more examples of the present Specification.

FIG. 5 is a flowchart of a method 500 of performing a clock synchronization according to one or more examples of the present Specification.

In block 502, a device such as 4G cellular module 210 initializes its clock rate, and instructs the other device, such as WLAN module 220 to initialize its clock to the same rate, such as S−M. Throughout the examples of FIGS. 5, 6, and 7, 4G cellular module 210 and WLAN module 220 are used by way of non-limiting, illustrative example. However, it should be understood that any suitable devices or modules may be substituted for those discussed herein.

In block 504, 4G cellular module 210 sends one data word to WLAN module 220. This may be, for example, a UART word such as UART word 420 of FIG. 4. 4G cellular module 210 then waits for WLAN module 220 to echo the word back to 4G cellular module 210.

In block 506, 4G cellular module 210 notes whether the word was successfully echoed back or not. 4G cellular module 210 may store the results in an echo log 508. Echo log 508 is a log the result of each echo operation. This may be simply a one-bit flag indicating either success or failure for each echo operation, or it may be a more detailed log with additional information that can be used for more refined baud rate computations.

In block 510, the baud rate is incremented by x, as described above. Thus, 4G cellular module 210 increments its baud rate by x, and instructs WLAN module 220 to do the same.

In decision block 512, if the baud rate (B) has not exceeded the variance of the most diverse tolerance (M) (i.e., B>M), then the process continues in block 502. The process repeats until the full range of baud rates has been swept, from S−M to S+M.

Returning to decision block 512, once the full range of variances has been swept, then in block 599, the method is done.

The result of method 500 is that a complete echo log 508 has been built, indicating the success or failure of each step in the baud rate sweep.

Figure 6:
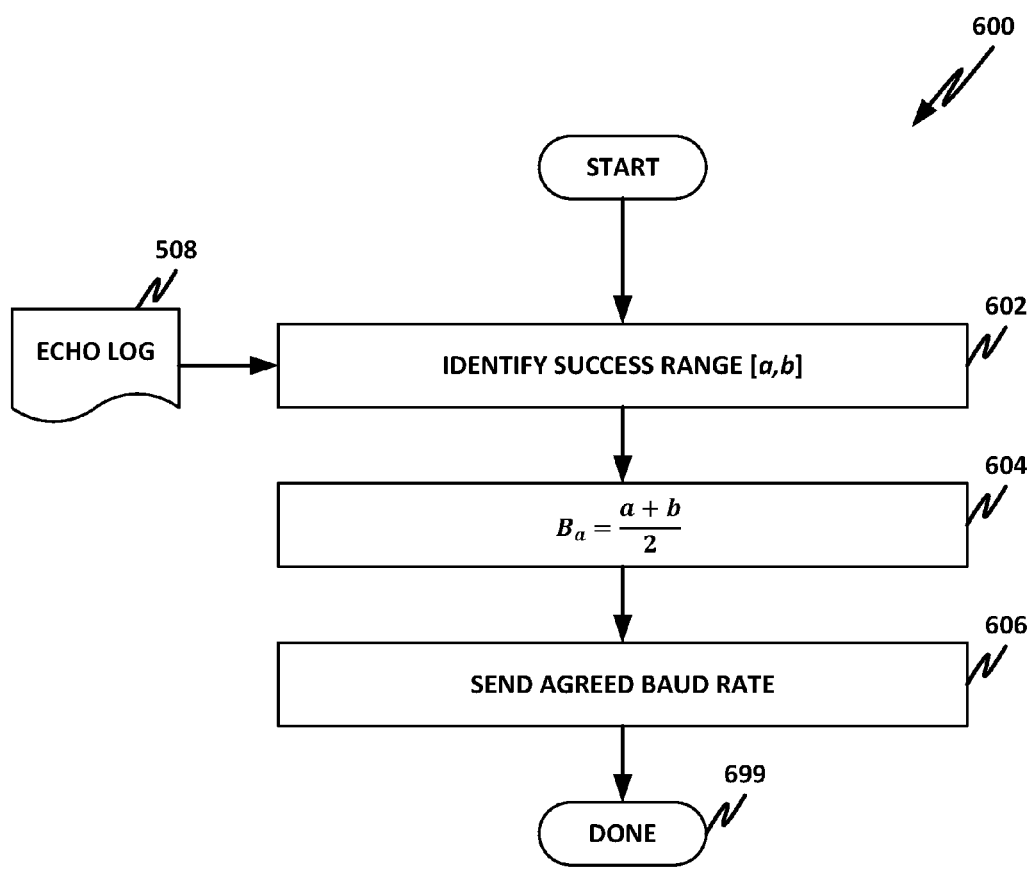
FIG. 6 is a flow chart of additional aspects of a method for adjusting a baud rate according to one or more examples of the present Specification.
Figure 7:
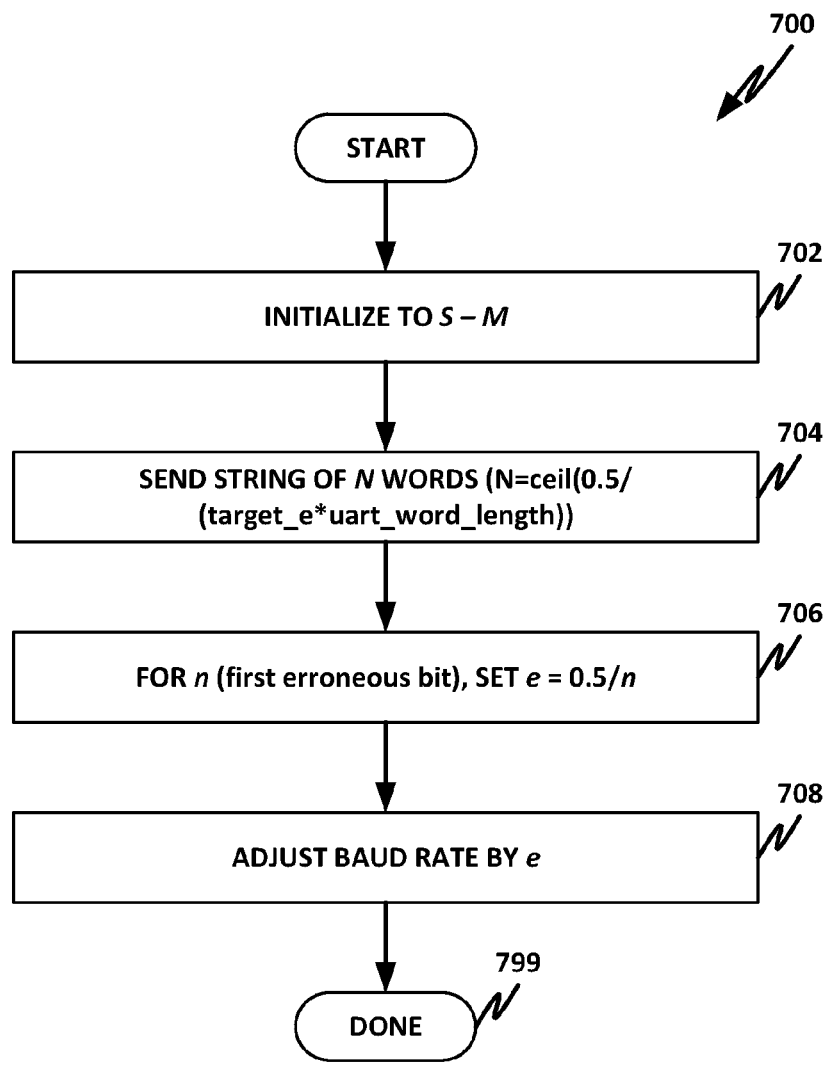
FIG. 7 is a flow chart of an additional method of adjusting a baud rate according to one or more examples of the present Specification.

FIG. 6 is a flowchart of a method 600 of using the information in echo log 508 to calculate an optimal baud rate according to one or more examples of the present Specification.

In block 602, 4G cellular module 210 inspects echo log 508 to determine a range of values that were successful. This may be a range of contiguous values, each of which was successful, bordered by values that were unsuccessful. The two terminal steps are designated as a and b.

In block 604, once the boundary values a and b have been identified, the optimal baud rate may be computed as $$\frac{a+b}{2}.$$

In other words, the optimal baud rate is a middle value of the two endpoints, such as the mean or median.

In block 606, 4G cellular module 202 sends the agreed baud rate S to WLAN module 220.

In block 699, the method is done.

In aggregate, the methods of FIG. 5 and FIG. 6 may be considered a baud rate sweep method. Method 700 of FIG. 7 may be considered a more mathematical method that does not require a baud rate sweep. There are various tradeoffs between method 600 and method 700. However, both methods are compatible with the teachings of the present Specification.

In block 702, 4G cellular module 210 again initializes the baud rate to a suitable value, such as S.

In block 704, 4G cellular module 210 sends a string of N words to WLAN module 220. WLAN module 220 then echoes the string of N words back to 4G cellular module 210.

In block 706, 4G cellular module 210 observes the position n of the first erroneous bit. The error value e may then be computed as $$\frac{0.5}{n}.$$

In block 708, the baud rate of both 4G cellular module 210 and WLAN module 220 may be adjusted by the value of e.

In 799, the method is done.

Figure 8:
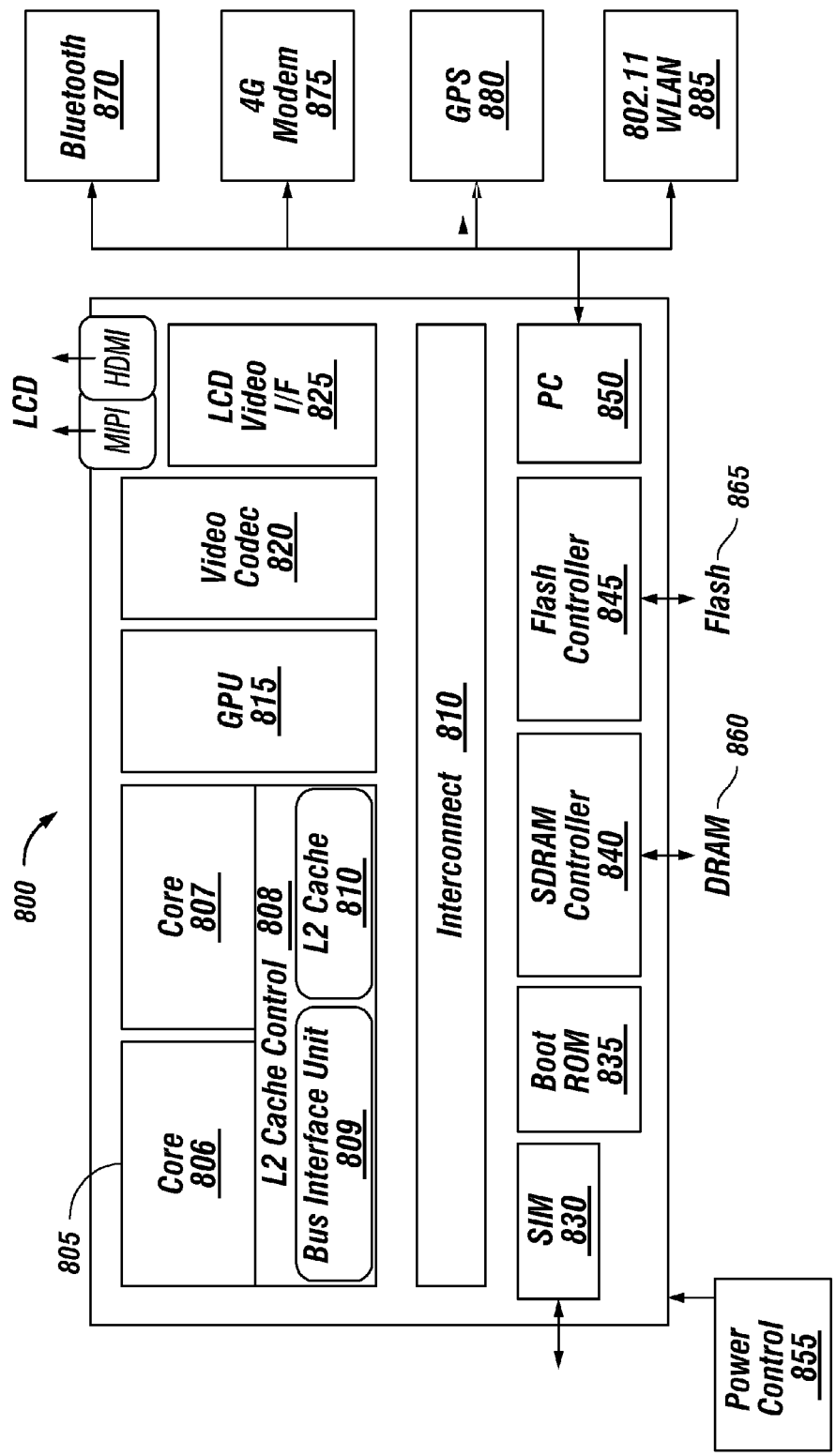
FIG. 8 is a block diagram of a user equipment (UE) device according to one or more examples of the present Specification.

Turning next to FIG. 8, an embodiment of a system on-chip (SOC) design in accordance with the inventions is depicted. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Similar to the discussion above, cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 810 includes an on-chip interconnect, such as an IOSF, AMBA, or other interconnect discussed above, which potentially implements one or more aspects of the described invention.

Internconnect 810 provides communication channels to the other components, such as a Subscriber Identity Module (SIM) 830 to interface with a SIM card, a boot ROM 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the invention described herein.

In addition, the system illustrates peripherals for communication, such as a Bluetooth module 870, 4G modem 875, GPS 880, and WLAN modem 885. Note as stated above, a UE includes a radio for communication. As a result, these peripheral communication modules are not all required. However, in a UE some form of a radio for external communication is to be included.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably configured processor, such as processor 110, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 110 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the Specification, to limit this disclosure in any way that is not otherwise expressly reflected in the appended claims.

Example Implementations

There is disclosed in an example 1, an apparatus, comprising: a first network interface, comprising a first clock and a local communication driver to communicatively couple the first network interface to a second network interface having a second clock; and one or more logic elements, including at least one hardware logic element, comprising a synchronization engine to: send a first plurality of data words from the first wireless interface to the second wireless interface via the local communication driver; receive back from the second wireless interface a second plurality of data words; assign a plurality of error rates to the data words of the second plurality of data words, the plurality of error rates indicating match or mismatch; identify a range of least error values within the plurality of error rates; and select an agreed baud rate from within the range.

There is disclosed in example 2, the computing apparatus of example 1, wherein the range is a range of contiguous zero error rates.

There is disclosed in example 3, the computing apparatus of example 2, wherein the agreed baud rate is a mean of the range of contiguous zero error rates.

There is disclosed in example 4, the computing apparatus of example 2, wherein the agreed baud rate is a median of the contiguous zero error rates.

There is disclosed in example 5, the computing apparatus of example 1, wherein the first wireless interface and the second wireless interface are of a first species and second species respectively.

There is disclosed in example 6, the computing apparatus of example 1, wherein sending the plurality of data words comprises sweeping a baud rate range.

There is disclosed in example 7, the computing apparatus of example 6, wherein terminals of the baud rate range are selected according to a tolerance range of at least one of the clocks.

There is disclosed in example 8, the computing apparatus of example 7, wherein the tolerance range is the tolerance range of the most variable clock.

There is disclosed in example 9, the computing apparatus of example 6, wherein sweeping the baud rate range comprises sweeping 2M/x steps, wherein M is the most variable baud rate of a tolerance of at least one of the clocks, and x is a step size.

There is disclosed in example 10, a method of providing a self-adapting baud rate between a first network interface and a second network interface, comprising: sending a first plurality of words from a first wireless interface to a second wireless interface via the local communication driver; receiving back from the second wireless interface a second plurality of data words; assigning a plurality of error rates to the data words of the second plurality of data words, the plurality of error rates indicating match or mismatch; identifying a range of least error values within the plurality of error rates; and selecting an agreed baud rate from within the range.

There is disclosed in example 11, the method of example 10, wherein the range is a range of contiguous zero error rates.

There is disclosed in example 12, the method of example 11, wherein the agreed baud rate is a mean of the range of contiguous zero error rates.

There is disclosed in example 13, the method of example 11, wherein the agreed baud rate is a median of the contiguous zero error rates.

There is disclosed in example 14, the method of example 12, wherein the first wireless interface and the second wireless interface are of a first species and second species respectively.

There is disclosed in example 15, the method of example 10, wherein sending the plurality of data words comprises sweeping a baud rate range.

There is disclosed in example 16, the method of example 15, wherein terminals of the baud rate range are selected according to a tolerance range of at least one of the clocks.

There is disclosed in example 17, the method of example 16, wherein the tolerance range is the tolerance range of the most variable clock.

There is disclosed in example 18, the method of example 15, wherein sweeping the baud rate range comprises sweeping 2M/x steps, wherein M is the most variable baud rate of a tolerance of at least one of the clocks, and x is a step size.

There is disclosed in example 19, one or more tangible, non-transitory computer-readable storage mediums having stored thereon executable instructions to instruct a processor for providing a self-adapting baud rate between a first network interface and a second network interface, comprising: sending a first plurality of words from a first wireless interface to a second wireless interface via the local communication driver; receiving back from the second wireless interface a second plurality of data words; assigning a plurality of error rates to the data words of the second plurality of data words, the plurality of error rates indicating match or mismatch; identifying a range of contiguous zero error values within the plurality of error rates; and selecting an agreed baud rate from within the range.

There is disclosed in example 20, the one or more tangible, non-transitory computer-readable mediums of example 19, wherein the agreed baud rate is a mean of the range of contiguous zero error rates.

There is disclosed in example 21, the one or more tangible, non-transitory computer-readable mediums of example 19, wherein the agreed baud rate is a median of the contiguous zero error rates.

There is disclosed in example 22, the one or more tangible, non-transitory computer-readable mediums of example 19, wherein the first wireless interface and the second wireless interface are of a first species and second species respectively.

There is disclosed in example 23, the one or more tangible, non-transitory computer-readable mediums of example 19, wherein sending the plurality of data words comprises sweeping a baud rate range.

There is disclosed in example 24, the one or more tangible, non-transitory computer-readable mediums of example 23, wherein terminals of the baud rate range are selected according to a tolerance range of at least one of the clocks.

There is disclosed in example 25, a method of providing a self-adapting baud rate between a first network interface of a first species and a second network interface of a second species, comprising: sending a sequence of N data words from the first network interface to the second network interface via the local communication driver; receiving an echo of the N data words via the local communication driver; identifying a first error bit within the N data words, the first error bit being at a position n, wherein N is selected according to $$= ceil\left(\frac{0.5}{e_{target} * l_{word}}\right),$$

wherein $e_{target}$ is a magnitude of a most variable tolerance, and $l_{word}$ is a length, in bits, of each data word; computing an estimated error e; and computing an agreed baud rate according to $$e = \frac{0.5}{n}.$$

There is further disclosed in an example 26, an apparatus comprising means for performing the method of example 25.

There is further disclosed in an example 27, one or more tangible, non-transitory computer-readable storage mediums having stored thereon executable instructions for instructing one or more processors for providing the synchronization engine of any of examples 1-9.

There is further disclosed in an example 28, one or more tangible, non-transitory computer-readable storage mediums having stored thereon executable instructions for instructing one or more processors for performing the method of any of examples 10-18.

There is further disclosed in an example 29, an apparatus comprising means for performing the method of any preceding example.

There is further disclosed in an example 30, the apparatus of example 31, wherein the means comprise a processor and a memory.

There is further disclosed in an example 31, the apparatus of example 30, wherein the means comprise one or more tangible, non-transitory computer-readable storage mediums.

There is further disclosed in an example 32, the example of apparatus 31, wherein the apparatus is a computing device.

What is claimed is:

1. A computing apparatus, comprising:
   a first network interface, comprising a first clock and a local communication driver to communicatively couple the first network interface to a second network interface having a second clock; and
   one or more logic elements, including at least one hardware logic element, comprising a synchronization engine to:
   send a first plurality of data words from the first network interface to the second network interface via the local communication driver, each data word of the first plurality of data words sent at a different baud rate;
   receive back from the second network interface a second plurality of data words based on the first plurality of data words;
   assign a plurality of error rates to the data words of the second plurality of data words, the plurality of error rates indicating match or mismatch between the data words of the first and second plurality of data words for each of the different baud rates;
   identify a range of least error values within the plurality of error rates; and
   select an agreed baud rate based on the range.

2. The computing apparatus of claim 1, wherein the range is a range of contiguous zero error rates.

3. The computing apparatus of claim 2, wherein the agreed baud rate is a mean of the range of contiguous zero error rates.

4. The computing apparatus of claim 2, wherein the agreed baud rate is a median of the contiguous zero error rates.

5. The computing apparatus of claim 1, wherein the first network interface and the second network interface are of a first species and a second species, respectively.

6. The computing apparatus of claim 1, wherein sending the plurality of data words comprises sweeping a baud rate range.

7. The computing apparatus of claim 6, wherein terminals of the baud rate range are selected according to a tolerance range of at least one of the first clock or the second clock.

8. The computing apparatus of claim 7, wherein the tolerance range is the tolerance range of a most variable clock of the first and second clocks.

9. The computing apparatus of claim 6, wherein sweeping the baud rate range comprises sweeping 2M/x steps, wherein M is a most variable baud rate of a tolerance of at least one of the first clock or the second clock, and x is a step size.

10. A method of providing a self-adapting baud rate between a first network interface and a second network interface, comprising:
    sending a first plurality of data words from a first network interface to a second network interface via a local communication driver, each data word of the first plurality of data words sent at a different baud rate;
    receiving back from the second network interface a second plurality of data words based on the first plurality of data words;
    assigning a plurality of error rates to the data words of the second plurality of data words, the plurality of error rates indicating match or mismatch between the data words of the first and second plurality of data words for each of the different baud rates;
    identifying a range of least error values within the plurality of error rates; and
    selecting an agreed baud rate based on the range.

11. The method of claim 10, wherein the range is a range of contiguous zero error rates.

12. The method of claim 11, wherein the agreed baud rate is a mean of the range of contiguous zero error rates.

13. The method of claim 11, wherein the agreed baud rate is a median of the contiguous zero error rates.

14. The method of claim 12, wherein the first network interface and the second network interface are of a first species and second species respectively.

15. The method of claim 10, wherein sending the plurality of data words comprises sweeping a baud rate range.

16. The method of claim 15, wherein terminals of the baud rate range are selected according to a tolerance range of at least one of a first clock of the first network interface and a second clock of the second network interface.

17. The method of claim 16, wherein the tolerance range is the tolerance range of a most variable clock of the first and second clocks.

18. The method of claim 15, wherein sweeping the baud rate range comprises sweeping 2M/x steps, wherein M is a most variable baud rate of a tolerance of at least one of a first clock of the first network interface and a second clock of the second network interface, and x is a step size.

19. One or more tangible, non-transitory computer-readable storage mediums having stored thereon executable instructions to instruct a processor for providing a self-adapting baud rate between a first network interface and a second network interface, comprising:
sending a first plurality of data words from a first network interface to a second network interface via a local communication driver, each data word of the first plurality of data words sent at a different baud rate;
receiving back from the second network interface a second plurality of data words based on the first plurality of data words;
assigning a plurality of error rates to the data words of the second plurality of data words, the plurality of error rates indicating match or mismatch between the data words of the first and second plurality of data words for each of the different baud rates;
identifying a range of contiguous zero error values within the plurality of error rates; and
selecting an agreed baud rate based on the range.

20. The one or more tangible, non-transitory computer-readable mediums of claim 19, wherein the agreed baud rate is a mean of the range of contiguous zero error rates.

21. The one or more tangible, non-transitory computer-readable mediums of claim 19, wherein the agreed baud rate is a median of the contiguous zero error rates.

22. The one or more tangible, non-transitory computer-readable mediums of claim 19, wherein the first network interface and the second network interface are of a first species and second species respectively.

23. The one or more tangible, non-transitory computer-readable mediums of claim 19, wherein sending the plurality of data words comprises sweeping a baud rate range.

24. The one or more tangible, non-transitory computer-readable mediums of claim 23, wherein terminals of the baud rate range are selected according to a tolerance range of at least one of a first clock of the first network interface and a second clock of the second network interface.

25. A method of providing a self-adapting baud rate between a first network interface of a first species and a second network interface of a second species, comprising:
sending a sequence of N data words from the first network interface to the second network interface via a local communication driver;
receiving an echo of the N data words via the local communication driver;
identifying a first error bit within the N data words, the first error bit being at a position n, wherein N is selected according to $$= ceil\left(\frac{0.5}{e_{target} * l_{word}}\right),$$

wherein $e_{target}$ is a magnitude of a most variable tolerance, and $l_{word}$ is a length, in bits, of each data word;
computing an estimated error e; and
computing an agreed baud rate according to $$e = \frac{0.5}{n}.$$

* * * * *